United States Patent

Abraham

[15] 3,637,191
[45] Jan. 25, 1972

[54] FOUNDRY MOLD AND CORE BLOWING MACHINE

[72] Inventor: Edward D. Abraham, Cleveland, Ohio

[73] Assignee: The Sherwin-Williams Company, Cleveland, Ohio

[22] Filed: Dec. 2, 1969

[21] Appl. No.: 881,459

Related U.S. Application Data

[63] Continuation-in-part of Ser. No. 626,782, Mar. 29, 1967, Pat. No. 3,494,412.

[52] U.S. Cl. .................................................259/153, 259/8
[51] Int. Cl. ..........................................................B28c 7/04
[58] Field of Search.................259/153, 154, 149, 161, 162, 259/163, 164, 165, 166, 168, 178, 179, 8, 23, 24, 43, 44, 65, 66, 67, 107, 108; 164/154, 202

[56] References Cited

UNITED STATES PATENTS

| 1,050,738 | 1/1913 | Hollstein | 259/66 X |
| 2,882,149 | 4/1959 | Willems | 259/66 X |
| 3,249,970 | 5/1966 | Hartley | 259/154 |
| 3,297,306 | 1/1967 | Napier | 259/8 |
| 3,334,869 | 8/1967 | Mukai | 259/23 X |

Primary Examiner—Robert W. Jenkins
Attorney—Oberlin, Maky, Donnelly & Renner

[57] ABSTRACT

A foundry mold or core blowing machine having an in situ sand-resin mixer operating in the cycle of the machine and positioned between the sand supply and the blow reservoir which mixer comprises a plurality of rotating mixing blades arranged in sand flow series, each blade rotating within its own chamber, with dry sand and a catalyst or accelerator being added to the initial chamber and resin to the second chamber.

28 Claims, 8 Drawing Figures

INVENTOR
EDWARD D. ABRAHAM

BY Oberlin, Maky, Donnelly & Renner
ATTORNEYS

INVENTOR
EDWARD D. ABRAHAM

FOUNDRY MOLD AND CORE BLOWING MACHINE

This application is a continuation-in-part of copending application, Ser. No. 626,782, filed Mar. 29, 1967, now U.S. Pat. No. 3,494,412.

This invention relates generally as indicated to a foundry mold and core blowing machine and more particularly to such a machine incorporating a sand-resin mixer.

In the production of foundry molds and cores, it has always been desirable to reduce the core or mold cure time to a minimum which, of course, also reduces the machine cycle time to a minimum thus increasing its production rate. In order to accomplish this, it has been found that the mixed sand bench life should be reduced to a minimum, bench life being that time period during which the mixed sand remains usable, and to place the sand-resin mixer as close as possible to the point of sand usage. It is also important to maintain an accurate ratio between the resin, activator or catalyst, and sand during the mixing operation.

Heretofore, large batch-type mixers have been employed servicing a wide variety of machines, but these are, of course, extremely large, difficult to automate, and do not satisfy the minimal bench life criterion. Resin coated sands are also employed widely which are of a dry- or free-flowing type and these require substantial mulling and carefully controlled temperature conditions to drive, for example, solvents from the sand to produce the nontacky coating on the sand particles. The dry coated sand is then supplied to molding machines such as shell machines much as would be green sand.

It is accordingly a principal object of the present invention to provide a mold or core making machine having a minimal cure time.

Another principal object is the provision of a machine of the type indicated having a minimal cycle time.

Another important object is the provision of a foundry mold or core blowing machine incorporating a resin-sand mixer in the machine itself between the sand supply and the sand blow reservoir.

A further object is the provision of such machine wherein the sand-resin mixer is as close as possible to the point of sand usage.

Yet another object is the provision of such a machine incorporating a sand-resin mixer which will maintain an accurate ratio between the resin, activator or catalyst, and the sand in the mix.

Still another object is the provision of a sand-resin mixer having three stages arranged in series which will obtain the accurate ratio indicated above.

A yet further object is the provision of a sand-resin mixer incorporated in a mold or core blowing machine which is easy to clean, requires little or no additional floor space, and which is easy to adjust both as to mixing rate and proportion of the mix components while still providing the aforementioned uniform mix or accurate ratio between the resin, catalyst and sand.

Yet another object is the provision of a sand-resin mixer incorporated in the foundry machine making it possible to mix sand at various rates required by the machine which reduces sand waste and permits one man to operate several machines and thus several mixers.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

Figure 1:
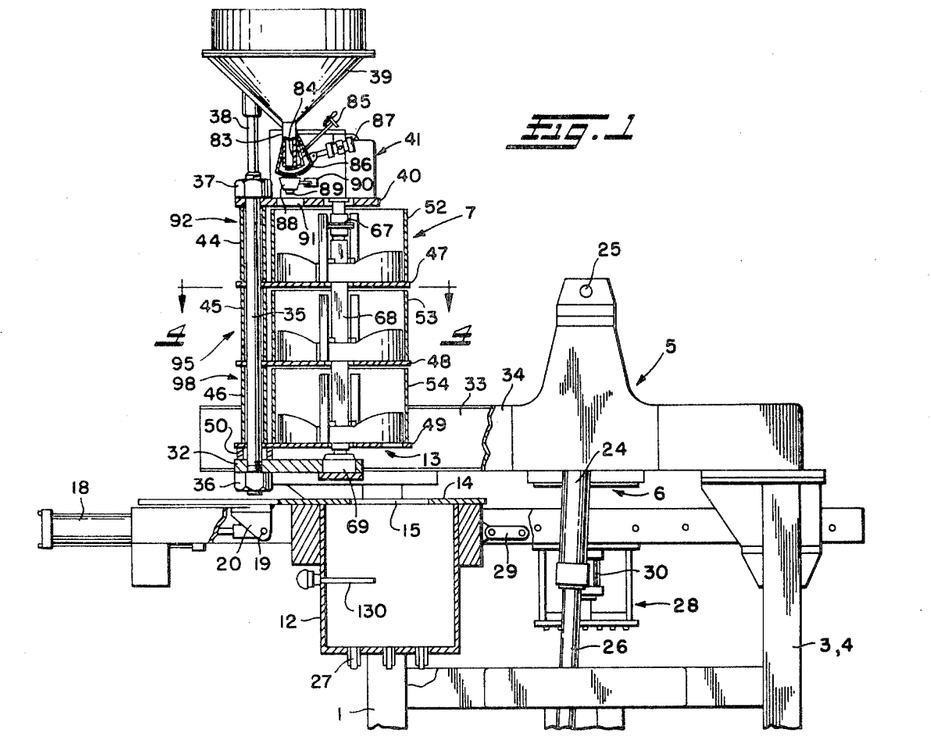
FIG. 1 is a fragmentary side elevation partially broken away and in section of a foundry mold or core blowing machine incorporating the present invention.
Figure 2:
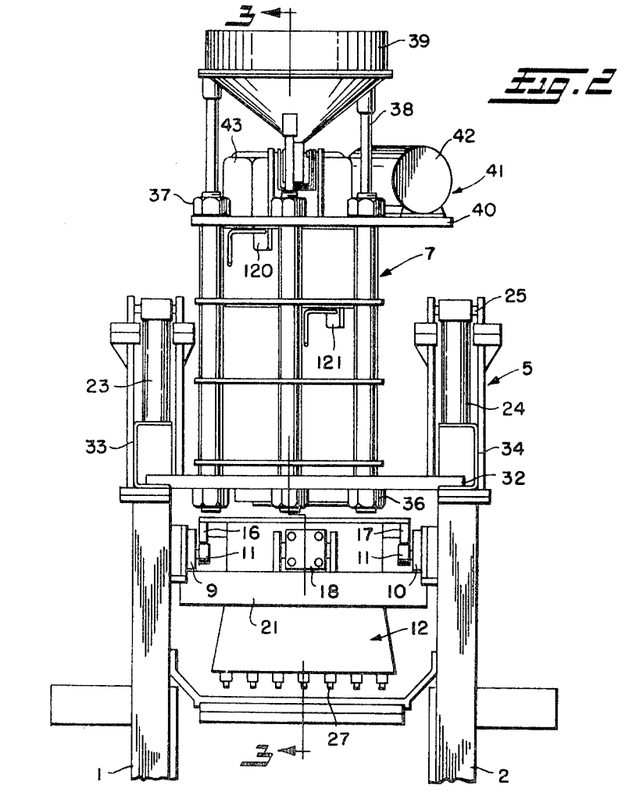
FIG. 2 is a fragmentary end elevation of the machine shown in FIG. 1 as seen from the left side thereof.
Figure 3:
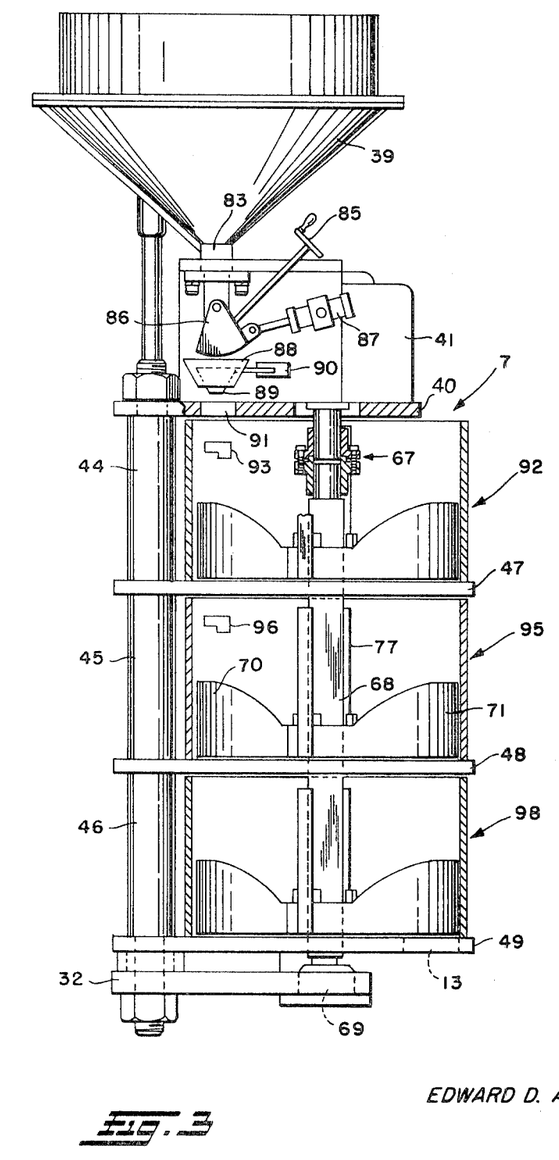
FIG. 3 is an enlarged view of the sand-resin mixer partially broken away and in section.

Referring now to the annexed drawings and more particularly to FIGS. 1, 2 and 3, it will be seen that the machine comprises an upstanding frame having four legs 1, 2, 3 and 4 at the corners thereof which support a head 5 which includes laterally spaced blow head 6 and sand-resin mixer 7. Secured to the inside of the legs 1 through 4 and extending in the direction of the spacing of the blow head and sand-resin mixer are rails 9 and 10 seen more clearly in FIG. 2 having inwardly projecting horizontally aligned spaced rollers 11 thereon which support sand blow reservoir 12 for horizontal shuttling movement between a position beneath the discharge orifice 13 of the mixer 7 and the blow head 6.

The reservoir 12 includes a top plate 14 having an opening 15 therein and extends laterally of the reservoir as indicated in FIG. 2 overlying at its edges rails 16 and 17 which ride on the rollers 11. The horizontal shuttling movement of the reservoir is obtained by a piston-cylinder assembly 18, the rod of which is connected at 19 to bracket 20 depending from the underside of the plate 14. The cylinder of the assembly 18 is secured to bracket 21 connected to longitudinal extensions of the supports for the rail 9 and 10.

The head 5 supports the blind ends of clamp piston-cylinder assemblies 23 and 24 as indicated at 25 and the rods 26 of such assemblies are connected to a cradle, not shown, utilized to assemble, for example, cope and drag portions of a core box and clamp them thus assembled against the bottom of the blow reservoir 12 when the latter is beneath the blow head 6. Blow orifices 27 are provided in the bottom of the reservoir and the blow and exhaust valves are provided in the blow head 6. The clamp cylinders 23 and 24 accordingly clamp the assembled core box against the reservoir 12 and the reservoir in turn against the blow head 6.

A punch-out head 28 is connected to the reservoir 12 by means of the link 29 and when the reservoir is positioned beneath the mixer 7, the head 28 will automatically be positioned above the core box. A stripping piston-cylinder assembly 30 is provided in the head 28 and optionally, heating elements may be provided to apply heat to the core box during the curing portion of the cycle of the machine. For a more clear disclosure of the type of machine illustrated, reference may be had to Hatch U.S. Pat. No. 3,253,304 of Ellms U.S. Pat. No. 3,089,205. It will also be understood that the present invention may be applied to other and different types of mold or core blowing machines as, for example, those employing vertically split core or mold box halves such as illustrated in copending application of Leon F. Miller et al., Ser. No. 516,634, filed Dec. 27, 1965, now U.S. Pat. No. 3,439,733 entitled "Foundry Sand Forming Machine and Method."

Figure 4:
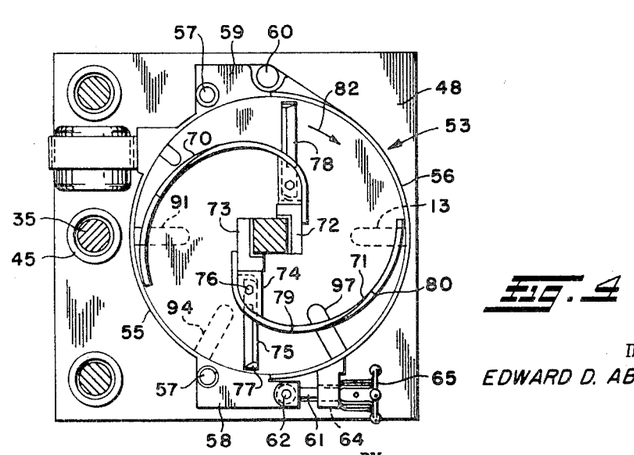
FIG. 4 is a horizontal section of the mixer taken substantially on the line 4—4 of FIG. 1.

The mixer 7 is supported on the head 5 by means of a mounting plate 32 extending between the columns 1 and 2 and fitted within the main structural frames 33 and 34 of the head 5. Extending upwardly from the baseplate 32 are three tie rods 35 having threaded end portions receiving large clamping nuts 36 at the bottom and 37 at the top. Upper extensions 38 of the tie rods support sand hopper 39. The lower nuts bear against the support plate 32 while the upper nuts bear against a mounting plate 30 for drive unit 41. The drive unit may include a motor 42 driving, for example, a 30-to-one speed reducer 43. The tie rods 35 are each surrounded by three sleeves 44, 45 and 46 of equal length which are interposed between the mounting plate 40, shelf 47, shelf 48 and bottom shelf 49, respectively. The bottom shelf is supported above the baseplate 32 by a somewhat larger diameter sleeve 50. Mounted on the shelves 47, 48 and 49 are shells 52, 53 and 54, respectively, each of which is comprised of a fixed semicircular shell half 55 and a hinged semicircular shell half 56, as seen in FIG. 4. Each shell or section of the mixer may be substantially identical in form.

As seen in FIG. 4, each fixed shell half 55 is secured to its supporting shelf through fasteners indicated at 57 extending vertically through projections 58 and 59 on the opposite sides thereof. The movable shell half 56 is secured to the fixed shell half by hinge pin 60 mounted in the projection 59 and by pivotal latch member 61 pivoted at 62 to the projection 58. The hinge shell half 56 is provided with a laterally extending projection 63 having an outwardly extending slot 64 therein and a manually operable clamping nut 65 is threaded on the end of the member 61 so that the pivotal shell half 56 can be clamped to the fixed shell half 55 to form a cylindrical shell. The shell half may thus readily be quickly opened and cleaned simply by unscrewing the clamping nut 65 and pivoting the member clear of the projection 63. Accordingly, each of the three vertically arranged sections of the mixer may readily individually be opened for cleaning or inspection of the interior.

The gear reducer 43 of the drive unit 41 is collected through flexible coupling 67 to vertically extending drive shaft 68 which is journaled at its lower end as indicated at 69 in the base 32. The shaft 68, except where it passes through the shelves 47, 48 and 49, is of square sectional shape. In each vertically arranged section of the mixer, there are two mixing arms secured to the shaft as indicated in FIG. 4 at 70 and 71. These mixing arms are mounted on the angle supports 72 and 73, respectively, secured to opposite sides of the shaft 68 and are of the convolute shape illustrated more clearly in FIG. 4. Each blade includes a gusset or brace 74 adjacent the shelf or sand floor which includes a recess on the bottom in which is fitted the proximal end of blade 75 held by fastener 76. The blade extends outwardly along the shelf or sand floor and includes an upstanding end portion 77, both of which have beveled leading edges as indicated at 78. The horizontal and vertical sections of the blade 75 thus sweep or plow sand from both the bottom wall and the circular peripheral wall of the respective sections of the mixer. Each of the convolute blades adjacent its proximal end are of uniform relatively low height and then beginning at approximately the point 79, increase in height to the point 80 and the remainder of the blade is of uniform height which is approximately twice that of the inner end of the blade.

The upper trailing edge of the blades 70 and 71 may be beveled from approximately the point 79 to the outer end so that the upper leading edge will present a relatively thin top edge which, for example, may approximate one thirty-second of an inch in a three-eighths inch thick blade. As indicated in FIGS. 1 and 3, the outer edge of the blades may rise to a height approximately half the total height of the mixer section.

The shaft 68 will, of course, be driven for rotation in the direction of the arrow 82 seen in FIG. 4 and the arms or blades 70 and 71 will move or plow the sand-resin mix to the periphery of the circular chambers in effect wedging the same against the peripheral sidewalls. The sand will then tumble over the increased height of the outer edge of the blade and be moved circularly around the mixing sections.

Dry sand from the hopper 39 drops through spout 83 at the bottom of the hopper, the discharge orifice of which is controlled by adjustable gate member 84. The extent to which the adjustable gate blocks the discharge orifice is controlled by handwheel 85. A chop gate 86 coaxially pivotally mounted with the valve member 84 is operated by a piston-cylinder assembly 87. When the chop gate is opened, sand will drop at a metered rate into funnel 88. The funnel 88 includes a movable interior funnel 89 which is connected to limit switch 90. When the interior funnel 89 fills with sand, its discharge rate being less than the input rate of sand, the weight of the sand within the interior funnel will then trip the limit switch 90 signalling the proper flow of sand.

In operation of the mixer, the sand will flow through the dry sand orifice 91 into the first stage 92 of the mixer dropping to the floor 47. Simultaneously the catalyst or accelerator is fed under pressure through nozzle 93 which is slightly circumferentially offset from the dry sand fill opening 91. The mixer arms and blades of the first stage 92 of the mixer then blend the dry sand and catalyst or accelerator while simultaneously conveying the mix in a clockwise direction as viewed in FIG. 4 around the circumference of the shell to first stage discharge orifice 94. As seen in FIG. 4, this first stage discharge orifice is offset approximately 60° from the fill opening 91 in a counterclockwise direction.

The catalyst-sand mixture, after being discharged through the orifice 94, falls to the floor 48 of the second stage 95 of the mixer. A resin or binder is then fed under pressure through nozzle 96 and is blended with the sand-catalyst mixture as it is conveyed around the inside circumference of the second stage shell by the mixing arms and blades thereof to the second stage discharge orifice 97. Again, the discharge orifice or the second stage is approximately 60° offset in a counterclockwise direction as viewed in FIG. 4 from the discharge orifice 94 of the first stage.

The sand-catalyst-resin mixture is then discharged through the orifice 97 to fall to the floor 49 of the third stage 98 of the mixer and the arms and blades of the third stage continue to blend the mixture and convey the same in a clockwise direction as viewed in FIG. 4 inside the circumference of the shell of the third stage to the discharge orifice 13 positioned above the opening 15 of the blow reservoir 12 when the latter is in the retracted or fill position shown in FIG. 1. The discharge orifices, more particularly 94, 97 and 13, are radially elongated so that the sand will not usually move circumferentially through the mixer stage more than once. The precise dimensions of these orifices may be varied to obtain different flow rates.

Figure 5:
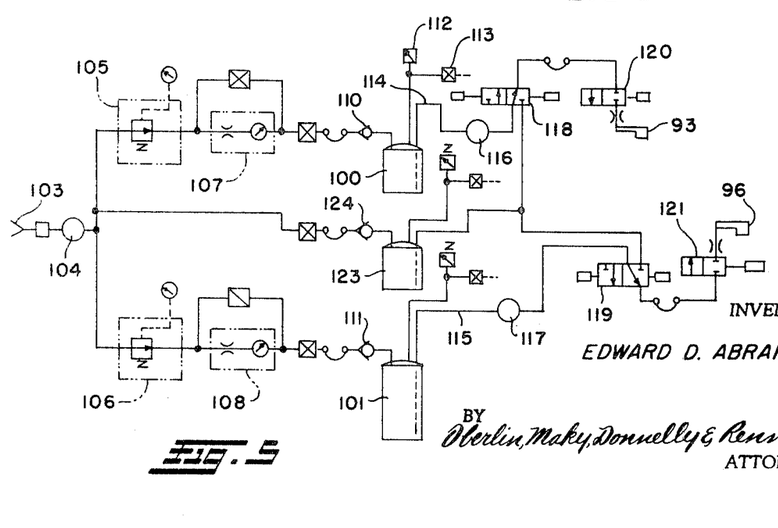
FIG. 5 is a schematic piping diagram of a portion of the machine.

Referring now to FIG. 5, it will be seen that the catalyst may be in pressure storage tank 100 while the resin is provided in resin pressure storage tank 101. To meter the resin and catalyst into the mixer, air at about 90 p.s.i. is supplied from source 103 through filter 104 to pressure regulators 105 and 106 for the catalyst and resin, respectively. The air then passes through flow meters 107 and 108, each provided with a manual bypass valve, indicated at 109, and then through back flow check valves 110 and 111, respectively, into the catalyst and resin tanks. Each storage tank is provided with a safety valve is indicated at 112 and a manually operable valve 113.

The catalyst and resin are then respectively forced from the storage tanks into supply lines 114 and 115 through filters 116 and 117, through manually operable directional valves 118 and 119, and finally through shutoff valves 120 and 121 to the nozzles 93 and 96, respectively. The flow of the resin and catalyst is controlled by means of the shutoff valves 120 and 121 which, for example, may be of the motorized ball type. These valves may be mounted directly on the shells of the first and second stages as indicated in FIG. 2 and FIG. 4.

A flush tank 123 is also provided with air being supplied to the flush tank through check valve 124 from the source 103. The valves 118 and 119 may thus be shifted to block flow from the catalyst and resin supply tanks and to open flow from the flush tank 123 to the nozzles 93 or 96.

The rate of flow for any particular fluid is determined by the pressure supplied to the catalyst and resin pressure storage tanks and, of course, the size of the discharge orifices of the nozzles 93 and 96. It has been found that by carefully controlling the pressure through the regulators and flow meters, a wide range of flow rates can be obtained within +2 percent.

Figure 6:
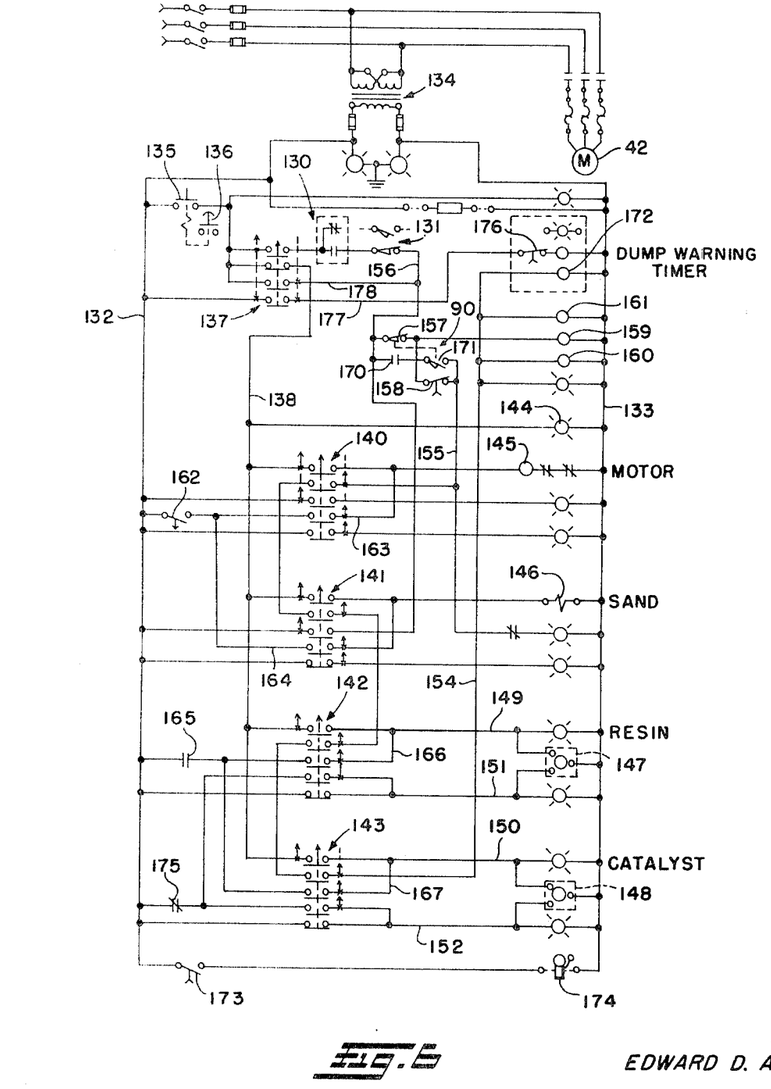
FIG. 6 is a schematic wiring diagram of a portion of the machine illustrating the operation of the mixer in the cycle of operation of the machine.

Referring now to FIGS. 1 and 6, it will be seen that the mixer 7 is operated in synchronism with the illustrated machine by means of two machine function controls. The first is a probe or level indicator 130 in the blow reservoir 12, seen in both FIGS. 1 and 6, and the second is a blow reservoir position limit switch 131. Accordingly, the reservoir 12 must be in the position shown in FIG. 1 and the sand-resin mix level in the reservoir must be below that dictated by the probe to call for additional sand-resin mix from the mixer 7. It is noted that no valve means is provided between the mixer and the blow reservoir so that the mixer is simply shut off to stop the flow, i.e., the motor 42 is turned off and the motorized valves for the resin and catalyst are closed. In a core blower of the type wherein the blow reservoir does not shift and a valve is provided at the fill opening thereof, the control of the mixer can then be interlocked with both a probe and the operation of the blow reservoir fill valve.

Referring now to FIG. 6, it will be seen that power to control mains 132 and 133 is provided through transformer 134. The transformer derives its power from the power lines to the drive motor 42 which is set to operate at a constant speed which is just below its maximum speed.

The mixer may be turned on by a pushbutton switch 135 of the maintain contact type and power may be disconnected by the pushbutton 136. Power is then supplied to a mode selector switch 137 which may include three modes, i.e., automatic, test and manual. In the center or test mode of the switch 137, test line 138 is connected to motor selector switch 140, sand selector switch 141, resin selector switch 142, and catalyst selector switch 143. Each of the latter selector switches has three modes, i.e., test, off and run. When the test line 138 is energized, a test mode indicator light 144 will be illuminated In the test mode, the selector switchs 140 through 143 may then be used selectively to energize the motor starter 145 for the motor 42, solenoid 146 for the sand control piston-cylinder assembly 87, seen in FIG. 1, motor 147 for resin valve 121, and motor 148 for catalyst valve 120. The valve motors 147 and 148 are turned on by energizing lines 149 and 150, respectively, and turned off by energizing lines 151 and 152, respectively.

In the run condition of the selector switches 140 through 143, line 154 is energized from line 155 through each of the selector switches 140 through 143. The line 155 is energized from the line 156 through the selector switch 137 in the automatic mode condition thereof. It is noted that the line 156 contains in series both the probe 130 and the blow reservoir position limit switch 131. The line 155 is energized from the line 156 through the normally closed contacts 157 of sand flow limit switch 90 seen in FIG. 1 and the normally closed contacts 158 of sand flow indicator timer 159. The energization of the line 155 and thus the line 154 through the selector switches 140 through 143 energizes run cycle on relay 160 and also motor and sand timer 161. The energization of the motor and sand timer 161 immediately closes switch contacts 162 starting the motor 42 through line 163 and turning on the sand by energization of line 164. Simultaneously the relay 160 closes switch contacts 165 turning on the resin or binder through line 166 and the accelerator or catalyst through line 167. When the sand flow indicator timer 159 times out, it will open contacts 158 and close contacts 170, the latter being in parallel with the contacts 157 of the limit switch 90. If insufficient sand has fallen from the hopper 39 to trip the limit switch 90 opening contacts 157 and closing contacts 171 then power will be cut off to the line 155 and thus the line 154 deenergizing the timers 161 and 159 and the relay 160. This, of course, ensures that the sand is flowing properly to permit the mixing operation to proceed. The deenergization of the line 154 also would start dump warning timer 172 which, when it times out, closes contacts 173 energizing dump warning bell 174 to warn the operator that the contents of the machine must be cleaned. This of course, can be readily accomplished by opening the outer shell semicircular sections 56 of each of the three stages.

Deenergization of the timer 161 opens contacts 162 on slight delay to turn off the sand and motor while the relay 160 when it deenergizes closes contacts 175 to turn off the resin and catalyst valve motors 147 and 148 by energizing lines 151 and 152, respectively. The relay 160 also, of course, opens contacts 165 when it is deenergized.

The dump warning timer when it times out upon the lack of power in line 154 also opens contacts 176 in line 177 which is energized through the selector switch 137 in both the automatic and manual positions thereof. In the manual position of the switch 137, the control elements 130 and 131 may be bypassed through line 178 so that the mixer can be operated manually independently of the machine.

Figures 7, 8:
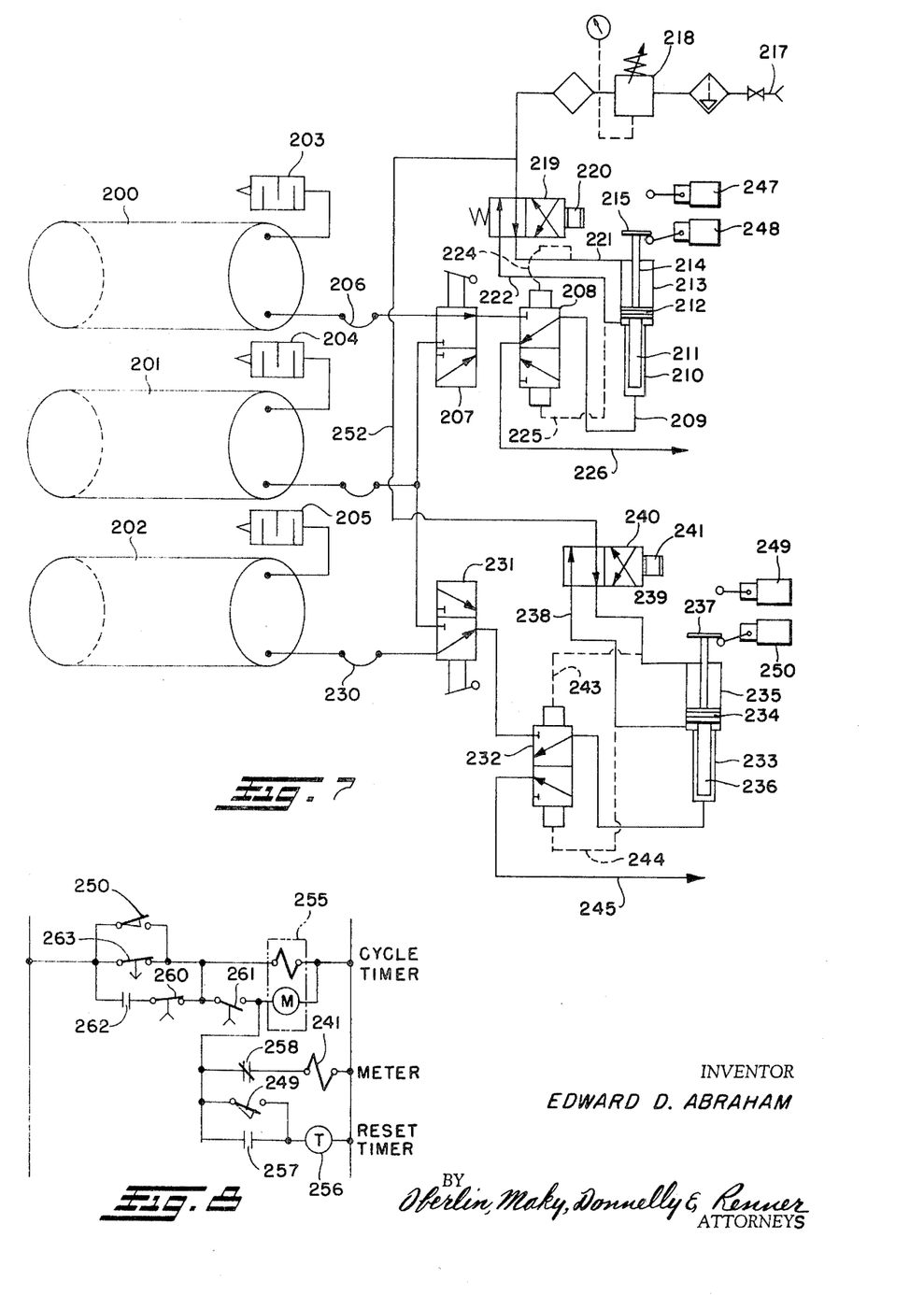
FIG. 7 is a schematic piping diagram of an alternative preferred metering system for the mixer.
FIG. 8 is a portion of a schematic wiring diagram such as shown in FIG. 6 especially adapted for the timer operation of the metering system of FIG. 7.

Referring now to the embodiment of the invention shown in FIG. 7, which is a preferred metering system not using pressurized tanks such as seen in FIG. 5, tanks 200, 201 and 202 may be provided for the resin or part I, a cleaner and the catalyst or part II, respectively. Each tank may be provided with a breather filter as seen at 203, 204 and 205, respectively. The part I tank 200 is connected through flexible hose 206 to manually operable valve 207 which is in turn connected to pilot operated valve 208. Such pilot operated valve 208 is connected through line 209 to the end of metering cylinder 210. A plunger 211 projects into such metering cylinder, such plunger being connected to piston 212 of piston-cylinder assembly 213. A rod 214 projects through the back end of the cylinder of such assembly and is provided with an actuator 215.

The piston-cylinder assembly 213 is actuated by air pressure obtained from filtered air inlet 217 which passes through regulator 218 to valve 219 operated by solenoid 220.

Depending upon the energization of the solenoid 220 and thus the position of the valve 219, air pressure is supplied to lien 221 or 222 connected to opposite ends of the cylinder of the piston-cylinder assembly 213. Pressurization of the line 221 will drive the piston 212 downwardly as seen in FIG. 7 and pressurization of the line 222 will drive such piston upwardly. Pilot lines 224 and 225 connected to the opposite ends of the valve 208 are connected to the lines 221 and 222, respectively. Accordingly, the valve 208 will shift depending upon which of the lines 221 and 222 is pressurized. Connected to the valve 208 is line 226 leading to, for example, nozzle 93 in the first or top mixing chamber.

The drum 202 containing part II is connected by flexible hose 230 to manually operable valve 231 which is in turn connected to pilot operated valve 232 which is in turn connected to the end of metering cylinder 233. Piston 234 of piston-cylinder assembly 235 drives plunger 236 in such metering cylinder and such piston is provided with actuator 237. The piston 234 is actuated through lines 238 and 239 through valve 240 operated by solenoid 241. Depending upon the energization of the solenoid 241 and thus the position of the valve 240, one of the lines 238 or 239 is pressurized and the other is vented to reciprocate the piston 234 moving the plunger 236 into and out of the metering cylinder 233. Valve 232 is operated by pilot line 243 and 244 connected to lines 239 and 238, respectively. The valve 232 is provided with line 245 connected to, for example, nozzle 96 for the second mixing chamber.

The actuators 215 and 237 for the respective metering cylinders trip limit switches seen at 247 and 248, and 249 and 250, respectively, signalling the condition of the metering cylinder, i.e., whether the cylinder is filled or empty. The cleaner in drum 201 may be connected to either metering cylinder by the manual shifting of the valves 207 or 231 which when shifted will shut off flow of part I or part II to the respective metering cylinders. Such drums 200 through 202 may be the drums in which the parts and cleaner are shipped and they may be laid on their sides in a cradle of the metering cylinders to give a gravity flow into the metering cylinders.

Both solenoid operated valves 219 and 240 are supplied with air under pressure from the filtered air inlet 217, air pressure to the valve 240 being supplied through branch line 252.

As seen in FIG. 8, each of the metering cylinders may be operated by a cycle timer 255. There will, of course, be one cycle timer for each of the metering cylinders. The metering cycle beings after the sand has had sufficient time to fall from the hopper to the mixer. At the start of the metering cycle, the timer 255 is energized and starts timing the frequency of the metering cylinder strokes. It will be understood that the shorter the time setting for the timer 255, the more strokes per minute and thus the more fluid is fed into the mixing chamber. The longer the time setting, the fewer strokes and less fluid per minute. There will be one stroke of the metering cylinder per time setting for the timer 255. When the timer 255 is energized, solenoid 241 is energizes and pressurizes line 238 to retract piston 234. Pilot line 244 is also pressurized shifting pilot valve 232 to connect the container 202 to the end of the metering cylinder. Thus fluid from the container is drawn into the metering cylinder as the metering cylinder retracts. Limit switch 250 closes as soon as the metering cylinder retracts enough to release it. The fluid enters the metering cylinder until it is full at which time limit switch 249 closes indicating that the metering cylinder is full. This energizes reset timer 256 closing contacts 257 and opening contacts 258. The opening of contacts 258 deenergizes solenoid 241. This shifts the valve 240 to the position shown in FIG. 7 pressurizing line 239 and shifting pilot valve 232 through pilot line 243. This now connects the line 245 to the end of the metering cylinder and closes the connection between the metering cylinder and the container 202. With the valve 240 back to its original position as seen in FIG. 7, the piston 234 starts down driving the plunger 236 into the metering cylinder 233. This forces the fluid within the metering cylinder through the valve 232 and the line 245 to the mixing chamber. Limit switch 249 opens as soon as the metering cylinder clears it on its return stroke. When the metering cylinder returns to it original or start position, limit switch 250 is open again. The unit remains in this condition until timer 250 times out. When such timer times out, it deenergizes itself and the timer 256. The timer 256 is an off-delay timer and starts its timing when the power is removed from the coil. It is used to give the timer 255 time to reset to the full dial setting, i.e., approximately one-half second. Timer 256 times out and then timer 255 is energized again starting the metering cycle over again.

If for any reason part I or part II does not complete its cycle in the time set on the cycle timer, then a control relay is energized stopping the mixer and indicating with a warning light that part I or part II metering cycle is not complete. The system can be reset, after the malfunction has been located and repaired. If the limit switches, such as 249 or 250, do not trip, the timing devices will shut themselves off.

The cycle timer 255 opens contacts 260 and closes contacts 261 on delay in addition to closing contacts 262. Reset timer 256 also opens contacts 263 off delay. A similar control system is employed to operate the metering cylinder for part I. In any event, by the setting of the respective timers, the amount of the resin and catalyst or two parts to the system can be metered into the mixer in the requisite amounts. The embodiment of FIGS. 7 and 8 has been found to be effective when the parts are thicker or more viscous.

It can now be seen that there is provided a foundry molding incorporating an in situ sand-resin or additive mixer which is capable of handling any of the presently available commercial resins or binders and catalysts or accelerators used in the production of sand cores or molds. The mixer may easily be maintained and cleaned and also can readily be adjusted to meet any desired mix proportions and sand usage rates, the mixer having been found to be accurate within 5 percent of the rate setting. With the mixer thus positioned as a contiguous part of the machine, supplying the material to the machine as required, much shorter cure times can be obtained thus increasing the production of the machine. Moreover, lower cure temperatures with a shorter bench life mean that aluminum mold or core boxes can be used which are more economical and have better heat conductivity.

I, therefore, particularly point out and distinctly claim as my invention:

1. A continuous flow sand additive mixer for foundry sand forming machines comprising a source of dry sand, a drive motor, a sand valve, means to adjust the extent of opening of said sand valve to control the sand flow rate, an additive valve, and means operative to control the flow from said mixer by controlling the operation of said motor, sand valve, and additive valve.

2. A mixer as set forth in claim 1 including timer operated switch contacts for said motor and said sand valve, and relay operated contacts for said additive valve, whereby the motor, sand valve and additive valve will be energized simultaneously when said mixer is turned on, and the latter will be deenergized before said motor and sand valve when said mixer is turned off to stop the flow therefrom.

3. A continuous flow mixer for foundry sand forming machines comprising vertically oriented chambers, a source of dry sand, a sand valve controlling flow of sand from said source to the top chamber, means to adjust the extent of opening of said sand valve to control the sand flow rate, rotatable mixing arms in said chambers, a drive motor for said arms, and a sand additive metering device operative to meter an additive into one of said chambers.

4. A mixer as set forth in claim 3 wherein said additive is a liquid and said metering device comprises a metering cylinder having a reciprocating plunger therein.

5. A mixer as set forth in claim 4 including drive means for said plunger operative initially to retract the same to draw liquid from a container and then extend the same to force liquid into one of said chambers.

6. A mixer as set forth in claim 3 including a sand flow sensor between said sand valve and said top chamber, and means to deenergize said motor if the sensor indicates the absence of sand flow.

7. A mixer as set forth in claim 3 including a cylindrical housing for each chamber, part of which is vertically hinged to provide access to the interior of each chamber.

8. A mixer as set forth in claim 3 including a scraper blades in each chamber moving closely adjacent the bottom wall of each chamber.

9. A mixer as set forth in claim 3 wherein said arms are substantially in the form of a convolute with the outer ends thereof trailing substantially behind the inner ends and moving adjacent the bottom of each chamber thereby to plow the sand radially outwardly.

10. A mixer as set forth in claim 3 wherein each arm extends to the peripheral wall of each chamber to require the sand to tumble over each arm.

11. A mixer as set forth in claim 3 wherein said arms are of increased uniform height at the outer ends thereof, the trailing upper edge of each being relieved to provide a relatively thin top edge.

12. A continuous flow sand additive mixer for foundry sand forming machines comprising a source of dry sand, a drive motor, a sand valve, an additive valve, means operative to control the flow from said mixer by controlling the operation of said motor, sand valve, and additive valve, a sand flow sensor on the exit side of said sand valve, a sand flow timer, and means interlocking said sand flow sensor and sand flow timer to stop said mixer after a predetermined interval on failure to obtain a predetermined sand flow 13. A continuous flow sand additive mixer for foundry sand forming machines comprising a source of dry sand, a drive motor, a sand valve, an additive valve, means operative to control the flow from said mixer by controlling the operation of said motor, sand valve, and additive valve, said additive being a resin, and a catalyst valve, and means operative to open and close said catalyst valve with said resin valve.

14. A continuous flow sand additive mixer for foundry sand forming machines comprising a source of dry sand, a drive motor, a sand valve, an additive valve, means operative to control the flow from said mixer by controlling the operation of said motor, sand valve, and additive valve, and selector switches for said drive motor, sand valve and additive valve, each switch having a run and test condition, means operative to connect the control elements for said motor, sand valve and additive valve in series through said selector switches in the run condition thereof, and means operative to energize said motor, said valve and additive valve directly when said switches are in test condition.

15. A continuous flow sand additive mixer for foundry sand forming machines comprising a source of dry sand, a drive motor, a sand valve, an additive valve, and means operative to control the flow from said mixer by controlling the operation of said motor, sand valve, and additive valve; said mixer including vertically oriented stages, each stage having rotatable mixing arms and a common shaft through said stages driven by said drive motor to which said arms are connected.

16. A mixer as set forth in claim 15 including a cylindrical housing for each stage, part of which is hinged to provide access to the interior of each stage.

17. A mixer as set forth in claim 15 including scraper blades in each stage moving closely adjacent the bottom wall of each stage.

18. A mixer as set forth in claim 15 including a discharge opening for each stage, each discharge opening being radially elongated and off set slightly in a contrarotative direction of said mixing arms from the opening of a preceding stage.

19. A mixer as set forth in claim 15 wherein said arms are substantially in the form of a convolute with the outer ends thereof trailing substantially behind the inner ends and moving adjacent the bottom of each stage thereby to plow the sand radially outwardly.

20. A mixer as set forth in claim 15 wherein each arm extends to the peripheral wall of each stage to require the sand to tumble over each arm.

21. A mixer as set forth in claim 15 wherein said arms are of increased uniform height at the outer ends thereof, the trailing upper edge of each being relieved to provide a relatively thin top edge.

22. A mixer as set forth in claim 15 wherein said additive is a resin, an air-over-resin storage tank, and means operative to control the pressure of such air to control the flow rate of such resin.

23. A mixer as set forth in claim 15 wherein said additive is a resin including a catalyst valve, said catalyst valve and sand valve being operative to admit sand and catalyst to the first stage, and said additive valve being operative to admit resin to the next stage.

24. A mixer as set forth in claim 15 including three stages, each stage having two mixing arms and two scraper blades rotating therein.

25. A mixer as set forth in claim 25 wherein said additive is a resin, a resin storage tank, a catalyst valve, a catalyst storage tank, a flush tank, and manually operable valve means operative selectively to connect said resin and catalyst valves to said flush tank.

26. A mixer for foundry sand forming machines comprising vertically oriented chambers, a source of dry sand, a sand valve controlling flow of sand from said source to the top chamber, rotatable mixing arms in said chambers, a drive motor for said arms, a sand additive metering device operative to meter an additive into one of said chambers, said additive being a liquid, and said metering device comprising a metering cylinder having a reciprocating plunger therein, drive means for said plunger operative initially to retract the same to draw liquid from a container and then extend the same to force liquid into one of said chambers, and a pneumatically operated piston-cylinder assembly operative to retract and extend said metering plunger.

27. A mixer as set forth in claim 26 including timer means operative to reciprocate said metering plunger, said timer means being settable to control the frequency of operation of said metering device.

28. A mixer as set forth in claim 27 wherein said additive includes two parts, an a metering device for each part operative to meter such parts into the top and next to the top chamber.

* * * * *